Sept. 28, 1965     C. E. BASHORE ETAL     3,209,288
ATTENUATOR WITH CONSTANT PHASE SHIFT EFFECTED BY
THE COMPENSATORY INSERTION AND REMOVAL
OF DIELECTRIC MATERIAL
Filed Sept. 23, 1963     3 Sheets-Sheet 1
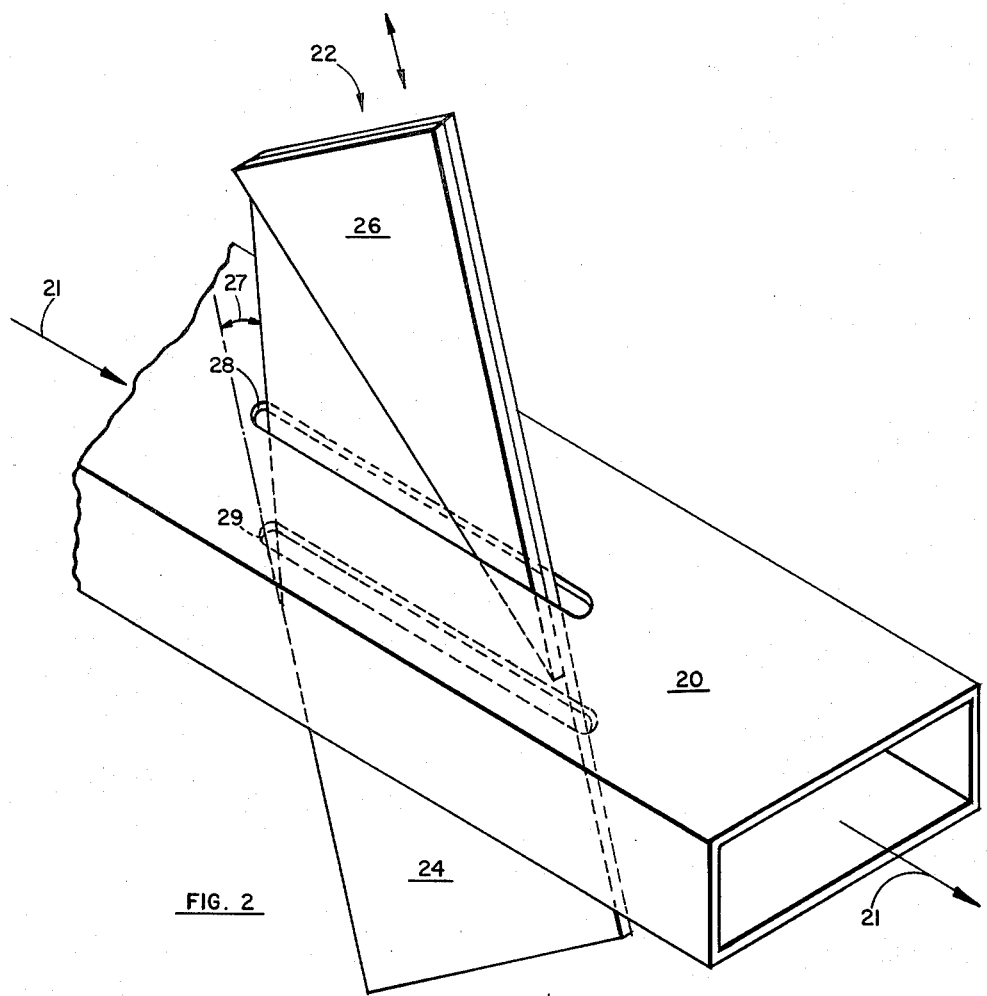
FIG. 2
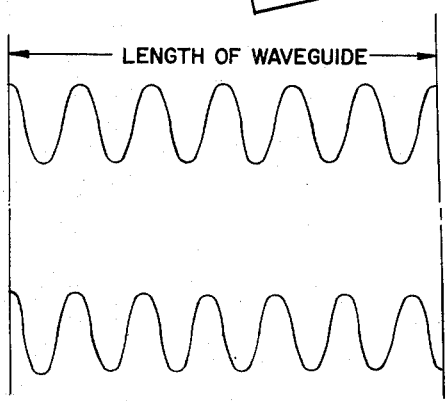
FIG. 1A
FIG. 1B
*INVENTORS*
CLINTON E. BASHORE
JERRY R. MAES
BY  JOHN L. SIMS
*Sidney Magnes*
AGENT

INVENTORS
CLINTON E. BASHORE
JERRY R. MAES
JOHN L. SIMS

BY Sidney Magnes

AGENT

INVENTORS
CLINTON E. BASHORE
JERRY R. MAES
BY JOHN L. SIMS

Sidney Magnes
AGENT

United States Patent Office
3,209,288
Patented Sept. 28, 1965

3,209,288
ATTENUATOR WITH CONSTANT PHASE SHIFT EFFECTED BY THE COMPENSATORY INSERTION AND REMOVAL OF DIELECTRIC MATERIAL
Clinton E. Bashore, La Mirada, Calif., Jerry R. Maes, Norwalk, Conn., and John L. Sims, Long Beach, Calif., assignors to North American Aviation, Inc.
Filed Sept. 23, 1963, Ser. No. 310,679
7 Claims. (Cl. 333—81)

This invention relates to an attenuator; and more particularly to an attenuator that has a constant phase-shift.

Background

It is frequently necessary to decrease the intensity of an electrical signal, and this operation is known as "attenuation." Attenuation becomes necessary, for example, when one electrical signal must have its intensity reduced so that its intensity has a predetermined ratio with respect to another electrical signal. At other times, various conditions cause an undesired attenuation of an electrical signal; and to measure the undesired attenuation, another signal—having a known intensity—is intentionally attenuated until its intensity is the same as the first signal. The intentionally-introduced attenuation is known, and is therefore equivalent to the undesired attenuation.

Other uses of attenuation are necessary under still other conditions.

Attenuation introduces a peculiar problem when the electrical signals are of the short-wavelength, or "microwave," type. Microwave energy is usually conducted from place to place through "waveguides," i.e., hollow metallic tubing that is usually rectangular in shape, and has dimensions determined by the wavelength of the electrical energy being conducted.

The problem encountered may be understood from the following discussion. Assume, for simplicity, that conditions are such that an integral number of wavelengths (say six) fit into a given length of an air-filled waveguide, as represented in FIGURE 1A. If now the waveguide were to be filled with a material different than air (a "dielectric" material, such as glass, fiberglass, styrene, or the like), the velocity of propagation of the microwave energy through the waveguide would be slower; and the effective wavelength of the microwave energy would be shortened. As a result, the exemplary representation of FIGURE 1B shows that a greater number of wavelengths (say six and a half) now fit into the same given length of dielectric-material-filled waveguide.

The relationship between the emergent energy from the air-filled waveguide of FIGURE 1A and emergent energy from the dielectric-filled, waveguide of FIGURE 1B is known as the "phase-shift," and is due to the presence of the dielectric material. This phase-shift is dependent on the amount of dielectric within the waveguide, its location, shape, dielectric constant, etc.

Phase-shifting always accompanies microwave attenuation, for the following reason.

In order to attenuate microwave energy, a "lossy" material such as carbon, a ferrite, a high-resistivity metallic film, or the like, is inserted into the waveguide; the lossy materials having the characteristic that they absorb microwave energy, thus resulting in attenuation. However, as discussed above, the insertion of a foreign material into the waveguide changes the propagation velocity of the microwave energy through the portion of the waveguide containing the foreign material. As a result a phase-shift occurs; so that the attenuation is accompanied by a phase-shift.

Ordinarily, the design of the system is such that the phase-shift accompanying attenuation can be ignored. However, in certain types of radar systems and other applications, it is essential that no extraneous phase-shift of any magnitude be introduced at any time. The stringent requirement tended to limit the usefulness of these particular radar systems; and improved results awaited the development of a simple, lightweight, reliable attenuator that did not introduce extraneous phase-shifts.

Objects and drawings

It is therefore the principal object of the present invention to provide an improved attenuator. The attainment of this object and others will be realized from the following specification, taken in conjunction with the drawings of which FIGURES 1A and 1B illustrate phase-shifting by variation of wavelength within a fixed length of waveguide, as already discussed above.

FIGURE 2 illustrates the basic inventive concept; and

Synopsis

Figure 3:
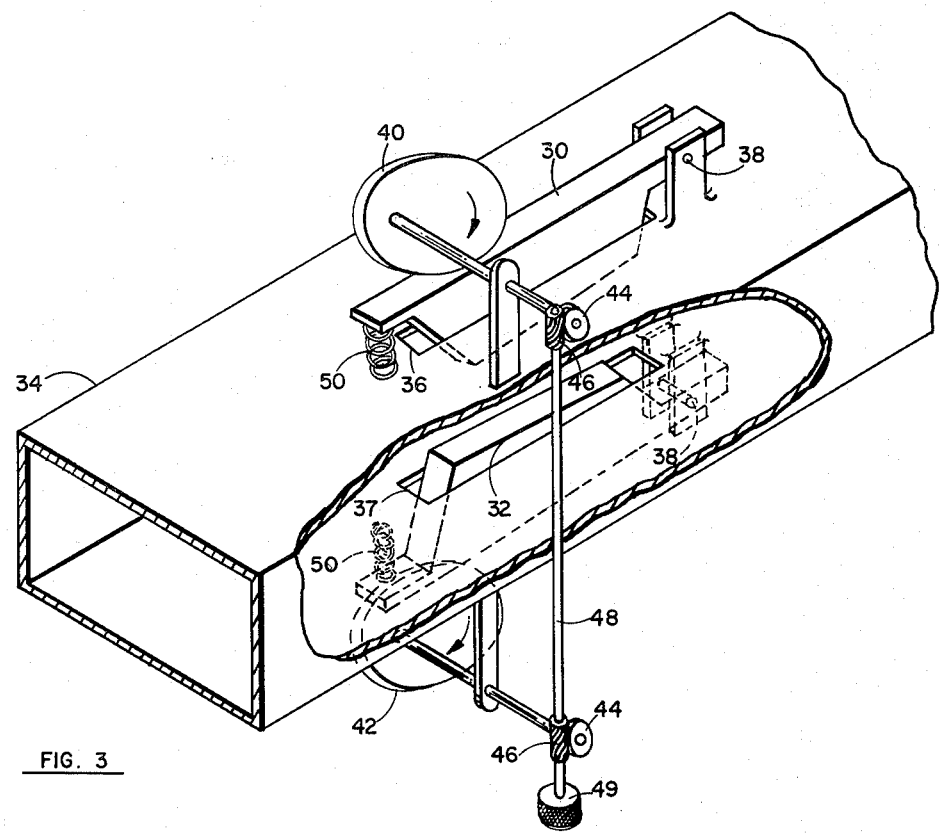
FIGURES 3-6 illustrate other arrangements for practicing the invention.

Broadly speaking, the present inventive concept contemplates the progressive insertion of a lossy material into a waveguide in order to produce desired attenuation. Since the progressive insertion of lossy material also inherently introduces a progressively changing phase-shift, a phase-shifting material is progressively withdrawn at a suitable rate, so that the phase-shift introduced by the phase-shifting material is progressively decreased. By correlating the insertion rate of the lossy material and the withdrawal rate of the phase-shifting material, the phase-shift of one action offsets the phase-shift of the other, so that a constant phase-shift is produced, regardless of the attenuation.

The principles of operation, various structures, and the theory of the inventive concept will be discussed in the following specification.

Description of invention

The inventive-concept will be understood from FIGURE 2. Here a waveguide 20 is conducting microwave energy in the direction indicated by the arrows 21. An attenuator 22, comprising a sheet, or substrate, 24 of dielectric material that provides suitable mechanical strength, is inserted manually or by suitable mechanical means, into waveguide 20 by means of slots 28 and 29. As previously discussed, substrate 24 of dielectric material introduces a phase-shift. If substrate 24 were of uniform width, once it were fully inserted into the waveguide at a fixed angle, moving it in the direction of the double-headed arrow would introduce the same amount of phase-shift, regardless of the movement. However, in accordance with the inventive concept, the substrate's outline is modified by tapering its width, as will be explained later.

Positioned on dielectric substrate 24 is a tapered-width configuration 26 of lossy material. Since the layer 26 of lossy material is tapered, as attenuator 22 is inserted into the waveguide 20 through longitudinal slots 28 and 29, progressively more of the lossy material 26 is positioned in the waveguide, thus producing progressively-more attenuation.

Since the layer 26 of lossy material is tapered, it inherently introduces a progressively-larger undesired phase-shift as it is inserted into the waveguide. Thus, increasing the attenuation inherently increases the phase-shift.

Three results are produced as attenuator 22 is inserted into the waveguide. First of all, the progressively increasing volume of lossy material introduced into the waveguide increases the attenuation of the electrical signal. Secondly, the progressively increasing volume of lossy material introduced into the waveguide progressively increases the phase-shift. And thirdly, due to the tapered configuration of dielectric substrate 24 in the vicinity of the lossy material, the progressively reduced volume of dielectric material introduced into the waveguide causes a progressively decreasing phase-shift.

In accordance with the present invention, the amount of phase-shift inherently introduced by the progressively-increasing volume of lossy material is compensated by the intentionally-introduced progressively-decreasing volume of dielectric material, so that the overall phase-shift introduced by these two materials is maintained constant. In this way, the attenuator produces a selective attenuation and a constant phase-shift.

Of course, as attenuator 22 is withdrawn, the change of phase-shift produced by the progressively-decreasing volume of lossy material positioned in the waveguide is offset by the change of phase-shift produced by the progressively-increasing volume of dielectric material in the waveguide. Again, the phase-shift is maintained constant.

The insertion angle of the attenuator 22 is selected to reduce the reflections caused by the microwave energy impinging on the upstream edge of attenuator 22; and the pattern of lossy material may be chosen to provide either uniform or predetermined changes in attenuation—depending upon the requirements of the system.

Since attenuation and phase-shift are most effectively produced at the center of the waveguide, the longitudinal slots 28 and 29 are cut through the center portion of the broad top and bottom walls of waveguide 20—the slots being long enough to admit attenuator 22, and narrow enough to minimize radiation from the waveguide.

While the layer 26 of lossy material is shown of appreciable thickness for clarity of illustration, in actuality it is as thin as possible, in order to minimize phase-shift.

Of course, the configuration of the substrate 24 depends on the particular dielectric material, its phase-shifting characteristic, and the desired compensatory rate of phase-shift desired.

FIGURE 3 shows another structure for providing selective attenuation with a constant phase-shift. In FIGURE 3, two separate sheet-like vanes, 30 and 32, are inserted through top and bottom walls of a waveguide 34, by means of centered slots 36 and 37; vane 30 being of a dielectric substrate coated with a thin layer lossy material, while vane 32 comprises a sheet of dielectric material. In accordance with the above-described inventive concept, the two vanes are interconnected in such a way that as vane 30 is inserted into the waveguide 34 to provide the desired attenuation (and undesired phase-shift), vane 32 of the dielectric material is withdrawn at a suitable rate so that its decrease of phase-shift neutralizes the increased phase-shift introduced by the insertion of the lossy material.

FIGURE 3 shows a mechanical interconnection wherein the vanes 30 and 32 are pivoted at pins 38, while suitably-shaped cams 40 and 42 are rotated to cause the insertion of the vanes 30 and 32. Cam rotation is produced by cam gears 44, that are in turn rotated by suitable worm gears 46; the rotation of the worm gears being controlled by a common shaft 48 and a knob 49. Means, such as resilient springs 50, are used to withdraw the vanes from the waveguide.

This arrangement has the advantage that the lossy-vane cam 40 may be an eccentrically-mounted circular disc, while the dielectric-vane cam 42 is a similar eccentrically-mounted circular disc whose periphery has been modified so that the movement of the dielectric vane is suitable for producing the desired compensatory phase-shift.

Figure 4:
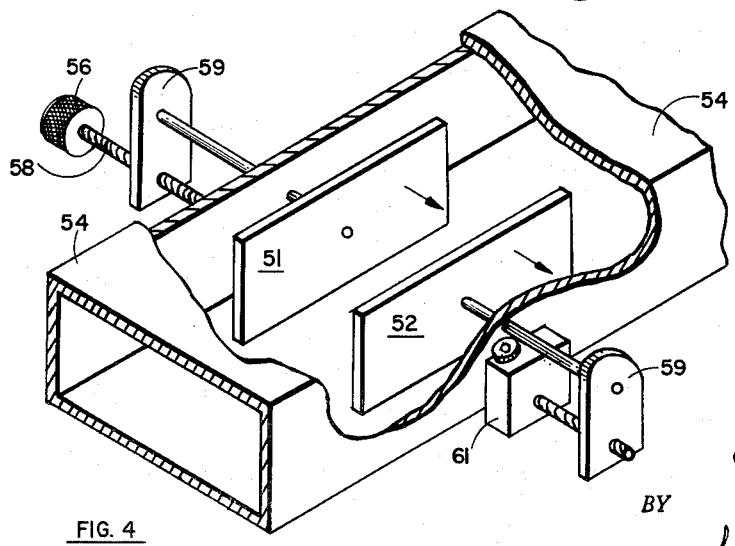

FIGURE 4 shows another attenuator arrangement, wherein two separate sheet-like vanes 51 and 52, of lossy and dielectric material respectively, are inserted from the sides of the waveguide 54. In this arrangement, the attenuation and phase-shift increase as the vanes approach the center of the waveguide. Therefore, the two vanes are so interconnected, that as the vane 51 of lossy material approaches the center of the waveguide—and thus introduces increased attenuation and a larger phase-shift, the vane 52 of dielectric material is withdrawn from the center of the waveguide—and thus decreases its phase-shift in a compensatory manner.

In FIGURE 4, a knob 56 rotates a threaded worm shaft 58 so that it threadedly engages lug portions 59 to move both vanes simultaneously in the same direction. A variable gear-box 61 permits dielectric vane 52 to be moved at the desired compensatory rate.

Figure 5:
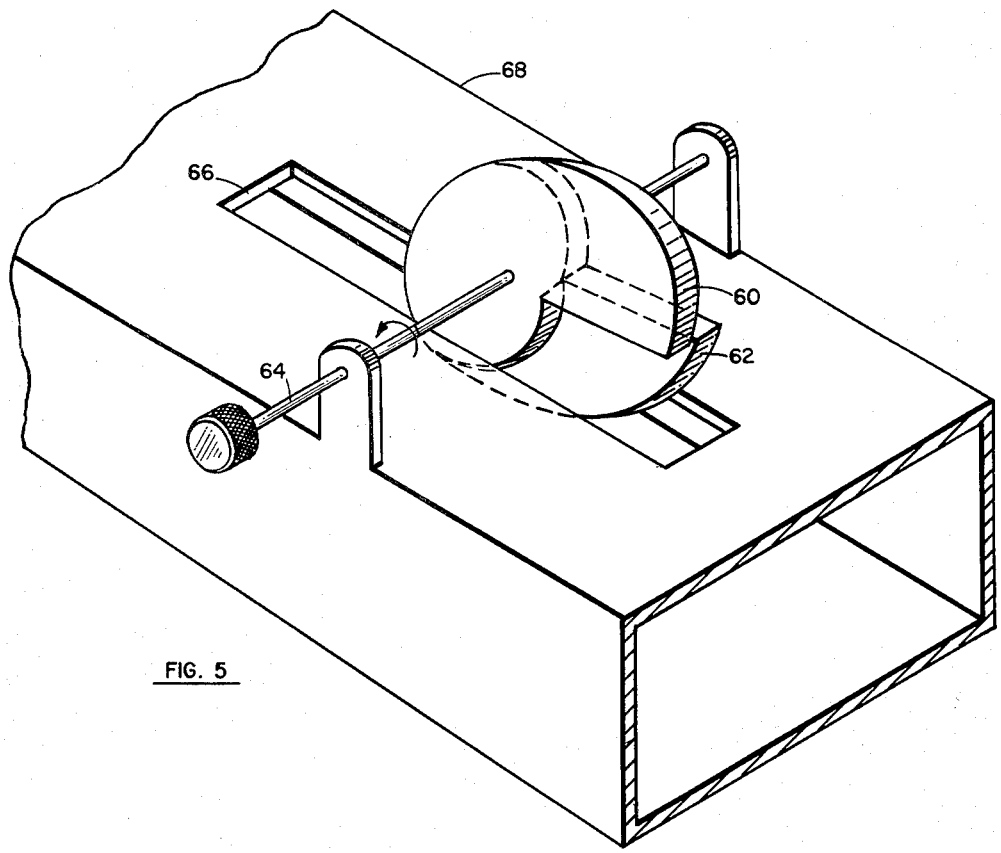

FIGURE 5 shows another arrangement, wherein rotary movement is used. In FIGURE 5 two separate cam-like discs 60 and 62 of configurated lossy and dielectric material respectively, are mounted on a common rotatable shaft 64. The two discs are juxtaposed, so that both project through slot 66 into waveguide 68. By suitably orienting the two discs, rotation of shaft 64 causes the lossy material of disc 60 to be progressively inserted into waveguide 68, while the dielectric material of disc 62 is withdrawn; the increasing phase-shift due to the progressively-increasing amount of lossy material being neutralized by the decreasing phase-shift due to the progressively-decreasing amount of dielectric material; in this way providing a constant phase-shift as the attenuation is changed.

Figure 6:
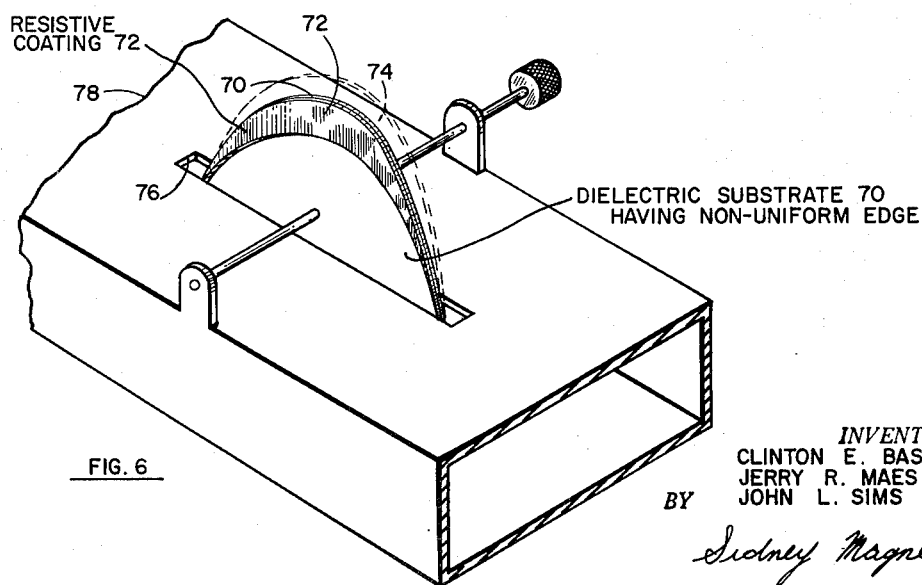

FIGURE 6 illustrates a compact, lightweight structure embodying the inventive concept. This arrangement comprises a disc 70 of dielectric material, which serves as a substrate; and onto this is deposited a thin configurated film 72 of lossy material. In this illustration, the configuration of lossy material 72 is such that continuous rotation of disc 70 causes a cyclically increasing and decreasing attenuation that produces a sinusoidal attenuation.

The peripheral portion 74 of the disc 70 is modified, by suitable shaping, to remove a sufficient area to produce a compensatory phase-shift, as disclosed above. If the lossy material extends to the edge of disc 70, removal of the peripheral portion would also remove the lossy material, and would thus change the attenuation characteristics. In this case, the peripheral portion may be modified by thinning from the back side, to produce the desired compensatory phase-shift.

The attenuator disc 70 protrudes through a slot 76 into the center portion of the waveguide 78.

As the composite attenuator is rotated, a progressively larger volume of lossy material is introduced into the waveguide in accordance with the pattern of lossy material, while simultaneously a progressively smaller volume of dielectric material (due to the removed or thinned peripheral portion) is introduced.

In this way the change of phase-shift is neutralized, so that a simple, compact, and lightweight, variable attenuator having a constant phase-shift is produced.

Although the invention has been illustrated and described in detail, it is to be clearly understood that the same is by way of illustration and example only and is not to be taken by way of limitation, the spirit and scope of this invention being limited only by the terms of the appended claims.

We claim:
1. An attenuator comprising
   a substrate of dielectric material;
   a configuration of lossy material positioned on said substrate;
   means for variably inserting a portion of said substrate and said configuration into a waveguide in order to vary the attenuation; and
   means for correspondingly variably inserting a portion of said substrate to introduce a change of phase-shift that compensates for the change of phase-shift introduced by the inserted portion of said lossy material.
2. A microwave attenuator comprising
   a waveguide section;
   a disc-like substrate of dielectric material;

a configuration of lossy material positioned on said substrate;

said substrate being mounted for variable insertion into said waveguide section;

the peripheral portion of said insertable substrate being modified to provide a phase-shift compensatory to the phase-shift provided by said lossy material within said waveguide section.

3. The combination comprising a waveguide having alined longitudinal slots in the top and bottom walls of said waveguide;

a first vane, comprising dielectric and lossy materials, positioned in one of said slots;

a second vane of dielectric material positioned in the other of said slots; and means for causing said vanes to move simultaneously in the same direction to cause said second vane to introduce a phase-shift that neutralizes the phase-shift introduced by said first vane.

4. The combination comprising a waveguide;

a first vane comprising lossy material positioned in said waveguide parallel to the side wall thereof;

a second vane of dielectric material positioned in said waveguide parallel to the side wall thereof;

means for moving said first vane toward the center of said waveguide to produce selective attenuation and an undesired phase shift; and means for moving said second vane away from the center of said waveguide to produce a phase-shift that neutralized the undesired phase-shift of said first vane.

5. The combination comprising a waveguide;

a first vane comprising lossy material positioned in said waveguide parallel to the side wall thereof;

a second vane of dielectric material positioned in said waveguide parallel to the side wall thereof;

means for moving said first vane and said second vane simultaneously in the same direction to cause said first vane to produce selective attenuation and an undesired phase shift while said second vane produces a phase-shift that neutralizes the undesired phase-shift of said first vane.

6. The combination comprising (A) a waveguide having a longitudinal slot in a broad wall of said waveguide;

(B) an attenuator positioned to protrude through said slot into said waveguide, said attenuator comprising (1) a first cam-like disc of lossy material;

(2) a second cam-like disc of dielectric material;

(3) said cams being mounted on a common shaft for rotating said cam-like discs simultaneously, (4) said first and second cam-like discs being oriented to cause the overall phase-shift to be substantially constant at all times.

7. The combination comprising (A) a waveguide having a longitudinal slot in a broad wall of said waveguide;

(B) an attenuator positioned to protrude through said slot into said waveguide, said attenuator comprising (1) a first cam-like disc of lossy material;

(2) a second cam-like disc of dielectric material;

(3) a common shaft;

(4) said cams being mounted on said common shaft for rotating said cam-like discs simultaneously, (5) said first cam-like disc being oriented to provide desired attenuation;

(6) said second cam-like disc being oriented to provide a compensatory phase-shift, so that overall phase-shift to be substantially constant at all times.

References Cited by the Examiner

UNITED STATES PATENTS

| | | | |
|---|---|---|---|
| 2,491,662 | 12/49 | Hoghton | 333—81 |
| 2,602,857 | 7/52 | Hewitt | 333—81 |
| 2,670,461 | 2/54 | Learned | 333—81 |
| 2,741,745 | 4/56 | Dibos | 333—81 |

FOREIGN PATENTS

| | | |
|---|---|---|
| 1,060,938 | 7/59 | Germany. |

HERMAN KARL SAALBACH, *Primary Examiner.*